US006735778B2

(12) United States Patent
Khoo et al.

(10) Patent No.: US 6,735,778 B2
(45) Date of Patent: May 11, 2004

(54) METHOD AND SYSTEM FOR PROVIDING HOME SHOPPING PROGRAMS

(76) Inventors: Denis Khoo, 9729 Camino Real, Arcadia, Los Angeles, CA (US) 91007; Raymond F. Ratcliff, III, 2717 Royal Troon Dr., Suite 200, Plano, TX (US) 75025

( * ) Notice: Subject to any disclaimer, the term of this patent is extended or adjusted under 35 U.S.C. 154(b) by 114 days.

(21) Appl. No.: 10/161,038

(22) Filed: Jun. 3, 2002

(65) Prior Publication Data

US 2003/0009759 A1 Jan. 9, 2003

Related U.S. Application Data

(63) Continuation-in-part of application No. 10/090,439, filed on Mar. 4, 2002, which is a continuation of application No. 09/487,120, filed on Jan. 19, 2000, now Pat. No. 6,434,747.

(51) Int. Cl.[7] .................... H04N 5/445; G06F 3/00; G06F 13/00; G06F 17/160
(52) U.S. Cl. ................ 725/60; 705/14; 705/26
(58) Field of Search ............ 725/61, 60, 37, 725/42, 23, 46; 705/14, 26, 27; H04N 5/445; G06F 3/00, 13/00, 17/60

(56) References Cited

U.S. PATENT DOCUMENTS

| 5,483,472 | A | * | 1/1996 | Overman ............... 705/28 |
| 5,621,456 | A |   | 4/1997 | Florin et al. |
| 5,640,002 | A | * | 6/1997 | Ruppert et al. ........ 235/462 |
| 5,745,710 | A |   | 4/1998 | Clanton et al. |
| 5,758,259 | A |   | 5/1998 | Lawler |
| 5,848,396 | A |   | 12/1998 | Gerace |
| 5,848,397 | A |   | 12/1998 | Marsh et al. |
| 5,861,881 | A |   | 1/1999 | Freeman et al. |
| 6,026,376 | A | * | 2/2000 | Kenney ............... 705/26 |
| 6,088,722 | A |   | 7/2000 | Herz et al. |
| 6,101,483 | A | * | 8/2000 | Petrovich et al. ......... 705/26 |
| 6,177,931 | B1 |  | 1/2001 | Alexander et al. |
| 6,211,901 | B1 |  | 4/2001 | Imajima et al. |
| 6,246,997 | B1 | * | 6/2001 | Cybul et al. ........... 705/27 |
| 6,336,100 | B1 | * | 1/2002 | Yamada ............... 705/26 |
| 6,386,450 | B1 | * | 5/2002 | Ogasawara ........... 235/383 |
| 6,484,146 | B2 | * | 11/2002 | Day et al. ............. 705/14 |

\* cited by examiner

Primary Examiner—Vivek Srivastava
(74) Attorney, Agent, or Firm—Pillsbury Winthrop LLP

(57) ABSTRACT

The present invention includes a method and system for providing home shopping programs to a viewer. An exemplary method includes receiving personalized data from a viewer, generating a home shopping program list that identifies a plurality of home shopping programs related to the personalized data, and transmitting the home shopping program list and a home shopping program that is listed in the program list to the viewer.

22 Claims, 16 Drawing Sheets

Enter Personalized Data

- ■ Male
- □ Female

/ 305

- ■ Soccer
- ■ Basketball
- □ Tennis
- ■ Golf

/ 315

- □ Age 5 - 10
- □ Age 10 - 18
- □ Age 18 - 24
- ■ Age 24 - 30
- □ Age 30 - 40
- □ Age 40+

| Nika Basketball Shoes | |
|---|---|
| Quantity Remaining: 427  335 | |
| Price: $83.10  340 | [Video Ad of Nika Basketball Shoes]  320 |
| Call 800-555-5555 to order now!  345 | |
| Next  350 | |
| The Nika Basketball Shoes provides excellent support for even the most demanding athlete. This stylish shoe is sure to improve your game.  325 | |

FIG. 3b

Enter Personalized Data

*Occasion*

- ● Browse for myself
- ○ Look for a specific item
- ● Browse for a birthday gift
- ○ Browse for a mother's day gift
- ○ Look for a wedding gift (registry)
- ○ Browse for an anniversary gift
- ○ Browse for a baby shower gift

FIG. 4a

Enter Personalized Data
Browse for a birthday gift

■ Male
□ Female

410

■ Sporting Equipment    415
□ Clothes
□ Jewelry
■ Electronics

□ Age 6 - 10
■ Age 10 - 18
□ Age 18 - 24
□ Age 24 - 30
□ Age 30 - 40
□ Age 40-50
□ Age 50+

| Ultra MP3 Player | | | | |
|---|---|---|---|---|
| Quantity Remaining: 984 | | | | |
| Price: $199.99 | | | | |
| Call 800-555-5555 to order now! | | | | Next |
| [Video Ad of portable MP3 player] | | | | |
| This compact MP3 player holds up to 10 hours of music and comes with a rechargeable battery. Neck leash included. Earphones not included. | | | | |

FIG. 4c

Welcome to Individual Shopping Network

Customized Home Shopping Program List

| Length | Shopping Program Name | Price | QTY Avail. |
|---|---|---|---|
| 8 minutes | Ultra MP3 Player | $199.99 | 984 |
| 2 minutes | Atlas Pro Beach Volleyball | $44.99 | 110 |
| 4 minutes | Samsong Home DVD Player | $150.00 | 42 |
| 2 minutes | Suny 30" HDTV | $500.00 | 44 |
| 1 minutes | Advanced Tennis Ball Set | $10.05 | 890 |
| 5 minutes | SprontPCS Cellular Phone | $200.00 | 437 |

465 ◁ 470

472 ▷

[ADD] 475  [REMOVE] 480  [MOVE UP] 485  [MOVE DOWN] 490

FIG. 4d

Enter Personalized Data
Occasion

○ Browse for myself
○ Look for a specific item
○ Browse for a birthday gift
○ Browse for a mother's day gift
● Look for a wedding gift (registry)
○ Browse for an anniversary gift
○ Browse for a baby shower gift

FIG. 5a

Enter Personalized Data
Browse for a wedding gift (registry)

Groom's Last Name Smith

Bride's Last Name Jones

We Found: John Smith & Tina Jones (Los Angeles)
Tom Smith & Mary Jones (New York)
Jack Smith & Cherry Jones (Dallas)
Frank Smith & Cindy Jones (Dallas)
Michael Smith & Michelle Jones (Miami)

FIG. 5b

| Shisheda 4 piece China set | | | | Next |
|---|---|---|---|---|
| Quantity Remaining: 26 | Price: $399.99 | Call 800-555-5555 to order now! | | |
| [Video Ad of Shisheda 4 piece china] | | | | |
| The Shisheda is an elegant china set that will make any dinner setting look fabulous. | | | | |

FIG. 5c

Welcome to Individual Shopping Network

Customized Home Shopping Program List 550

| Length | Shopping Program Name | Price | QTY Avail. |
|---|---|---|---|
| 5 minutes | Shisheda 4-piece china set | $399.99 | 26 |
| 3 minutes | Indian Throw Rug | $101.49 | 5 |
| 2 minutes | Globus 10 piece Knife Set | $199.95 | 20 |
| 4 minutes | Samsong Home DVD Player | $150.00 | 42 |
| 5 minutes | 500 watt Panason Microwave Oven | $200.00 | 98 |
| 5 minutes | AM Tower Speakers | $200.00 | 44 |

555

560

[ ADD ] 565  [ REMOVE ] 570  [ MOVE UP ] 575  [ MOVE DOWN ] 580

METHOD AND SYSTEM FOR PROVIDING HOME SHOPPING PROGRAMS

RELATED APPLICATIONS

This application is a continuation-in-part of U.S. patent application Ser. No. 10/090,439, filed Mar. 4, 2002, which is a continuation of U.S. patent application Ser. No. 09/487,120, filed Jan. 19, 2000 now U.S. Pat. No. 6,434,747. The related applications are incorporate by reference herein.

BACKGROUND OF THE INVENTION

1. Field of the Invention

The present invention relates generally to providing home shopping motion picture video. More particularly, the present invention relates to providing personalized home shopping motion picture video to viewers.

2. Description of the Related Art

Conventionally, on broadcast television, there are programs that advertise a product and provide viewers with the ability to make a purchase by ordering over the phone, the internet, or directly over the television set. A program that advertises a product and gives the viewer the ability to purchase the item is a home shopping program. Some examples of such programs are infomercials, advertisements, and broadcast shopping channels.

Infomercials are typically the same duration as a regular television program. An infomercial usually runs for about thirty minutes to an hour. An infomercial is essentially an extended commercial about a particular product. The seller of the product produces and airs the infomercial with the goal of informing the viewer about the product for sale, and persuading the viewer to purchase the product. Every so often, during the infomercial, a phone number or website will be displayed allowing the viewer an opportunity to make the purchase.

An advertisement is commonly a fifteen second to one minute segment that attempts to sell a particular product by discussing the product and finally providing a phone number or website where the product can be purchased.

Broadcast shopping channels are broadcast channels dedicated to selling products around the clock. These shopping channels are usually live and spend a few minutes on a particular product, before moving on to the next product. Broadcast shopping channels can essentially be defined as continuous, back to back, home shopping programs.

As noted in the above examples, home shopping programs come in many forms. Also note that all home shopping programs inform the viewer about a product and give the viewer the ability to purchase the product without leaving the home (if the viewer is watching the home shopping program at home).

There are several disadvantages in the way home shopping programs are distributed on television today.

A first disadvantage is that since advertisements and infomercials are not aired on broadcast television on a given channel around the clock, the viewer must either find these home shopping programs, or by chance come across these home shopping programs. If the viewer wants to shop using the television set at a particular time, it is very difficult, and sometimes impossible, to find these home shopping programs. This, of course, is not a problem with broadcast shopping channels since they are airing home shopping programs around the clock.

A second disadvantage that applies to all of today's home shopping programs is the inefficient "shotgun" distribution of products and advertisements. A home shopping program for a particular product is aired on a broadcasting channel to everybody. This means that all viewers will see the same home shopping program whether or not they are interested in the product. For example, both a twenty year old male living in California and a sixty year old female living in Ohio will see the same home shopping program while watching shopping channel X.

A third disadvantage is that a viewer does not have the ability to shop for a particular type of product. For example, if a viewer is looking for baseball equipment to buy as a birthday gift for his friend, it will be nearly impossible for the viewer to find baseball home shopping programs.

A fourth disadvantage is that a viewer, while watching a broadcast shopping channel, cannot skip home shopping programs that do not interest the viewer. For example, if a viewer is watching broadcast shopping channel X, and a home shopping program selling jewelry is being shown, the viewer is unable to skip the home shopping program. The viewer must wait the appropriate amount of time before being shown the next home shopping program.

The subject invention is directed to a method and system that overcomes the above-described disadvantages.

SUMMARY OF THE INVENTION

The present invention provides a method and system for delivering home shopping programs to a viewer. The home shopping programs include, for example, infomercials, advertisements, and broadcast shopping channels.

A disclosed method includes the steps of receiving personalized data from the viewer, generating a home shopping program list that identifies a plurality of home shopping programs related to the personalized data, and transmitting the home shopping program list and a home shopping program identified in the program list to the viewer. The home shopping program can be viewed immediately upon its receipt.

The method may be carried out over a client/server network architecture, wherein the client is a general purpose computer or a television, the server is a general purpose computer, and the network is the Internet or an intranet.

Personalized data may include data descriptive of the viewer such as his/her gender, sports interests, and age. Personalized data may also include information descriptive of shopping occasions of interest to the viewer such as shopping for himself/herself, for a specific item, for a birthday gift, for a mother's day gift, for a wedding gift, for an anniversary gift, and shopping for a baby shower gift.

Another disclosed method includes the step of providing a client in communication with a server over a data network, transmitting personalized data over the client to the server, receiving a home shopping program list that identifies a plurality of home shopping programs related to the personalized data, and displaying a home shopping program, the program listed on the home shopping program list, on a display means of the client.

The viewer may select a home shopping program from the home shopping program list and display the selected home shopping program for viewing on the display means. In addition, the viewer may transmit to the server an order to purchase a product or service offered in a home shopping program. Further, the viewer may modify a home shopping program list by selecting a function for inserting a new home shopping program into, removing a home shopping program from, or moving a home shopping program within the home shopping program list. Thereafter, the viewer may transmit the modified home shopping program list to the server for storage.

A disclosed system includes a memory for storing personalized data, home shopping program lists, and home shopping programs, and a processor in communication with the memory. The processor is operative to receive personalized data from the viewer, generate a home shopping program list that identifies a plurality of home shopping programs related to the personalized data, and transmit a home shopping program identified in the home shopping program list to the viewer.

These and other embodiments of the present invention are disclosed in greater detail herein below.

BRIEF DESCRIPTION OF THE DRAWINGS

The invention and its advantages will be more readily apparent to those skilled in the art by reference to the detailed description provided herein below when considered in connection with the accompanying drawings, wherein:

FIGS. 3a, 3b, and 3c are screenshots of what a viewer sees in an embodiment of the present invention;

FIGS. 4a, 4b, 4c, and 4d are screenshots of what a viewer sees in an embodiment of the present invention;

FIGS. 5a, 5b, 5c, and 5d are screenshots of what a viewer sees in an embodiment of the present invention;

DETAILED DESCRIPTION OF EMBODIMENTS OF THE INVENTION

Figure 1:
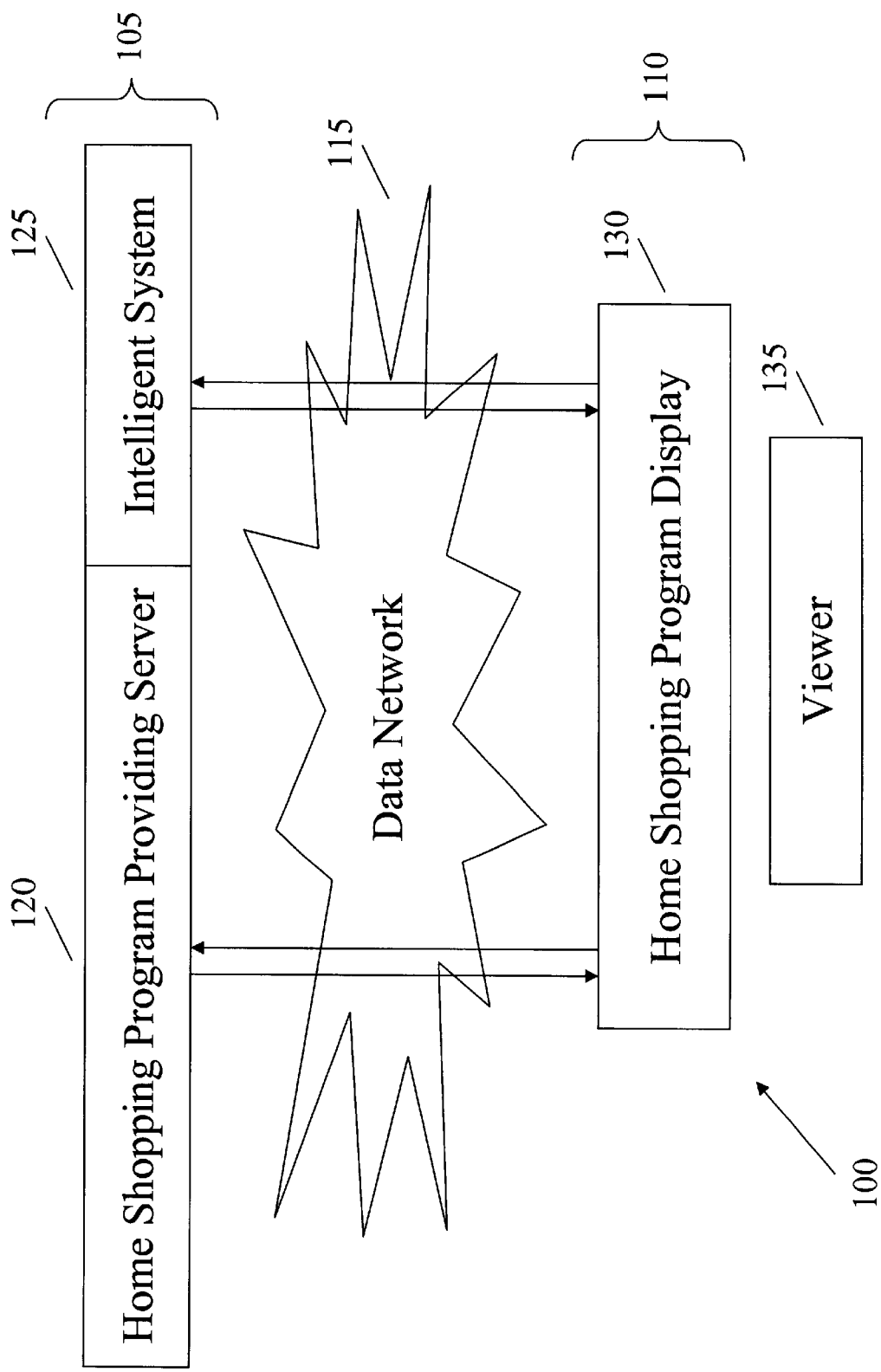
FIG. 1 is a high level block diagram view of an embodiment of a system for the present invention.

FIG. 1 shows a high level block diagram of a home shopping program system 100. A viewer 135 watches and interacts with a home shopping program display means 130. The home shopping program display means 130 is any display means capable of displaying home shopping programs to the viewer 135. Examples of the home shopping program display means 130 include a projection television, plasma screen television, or computer monitor. The home shopping program display means 130 communicates with an intelligent system 125 and a home shopping program providing server 120 via a data network 115. This embodiment of the home shopping program system 100 follows a conventional client 110/server 105 model.

Figure 2:
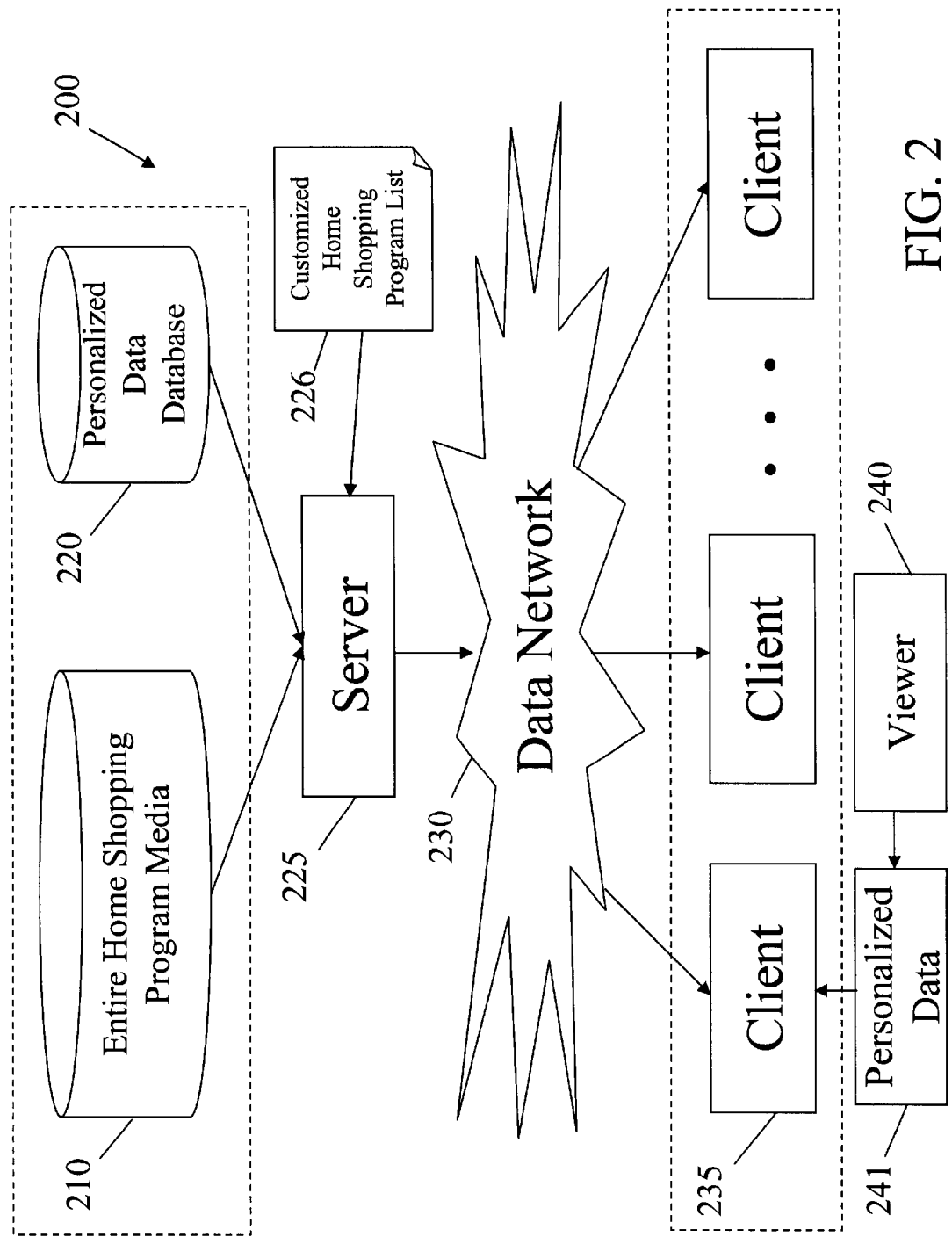
FIG. 2 is a technical block diagram view of an embodiment of a system for the present invention.

FIG. 2 is a technical block diagram view of an embodiment of a home shopping program system 200. FIG. 2 demonstrates the generation of a customized home shopping program list 226. First, a viewer 240 provides personalized data 241 to a client device 235. The client 235 transfers the personalized data 241 to a server 225 over a data network 230. The server 225 stores the personalized data on a personalized data database 220. Based on the personalized data 241 information and information about the available home shopping program media 210, the server 225 is able to generate the customized home shopping program list 226. The customized home shopping program list 226 is sent to the client 235 over the data network 230. The client 235, based on the customized home shopping program list 226, displays home shopping programs to the viewer 240.

The home shopping program system 200 does not require the provisioning of personalized data 241 from the client 235 to the server 225 if the personalized data 241 is already stored in the personalized data database 220. Consequentially, the viewer 240 is not required to provide personalized data 241 unless a change to the personalized data 241 is requested by the viewer 240.

FIG. 3a is an exemplary screenshot used by a viewer 240 to provide personalized data 241 to a client 235. The screenshot allows the viewer 240 to specify information about him or herself. The viewer 240 may specify, for example, his/her gender 305, interest in sports 315, and age 310. In the exemplary screenshot the viewer 240 has specified that he is a male, between the age of twenty four and thirty, and has an interest in soccer, basketball, and golf. The information collected on this screenshot will be used as personalized data 241. The personalized data 241 is sent to the server 225 from the client 235. The server 225 generates a customized home shopping program list 226, and sends the customized home shopping program list 226 to the client 235.

FIG. 3b is an exemplary screenshot of a home shopping program being displayed to the viewer 240. In this example, the viewer sees a home shopping program for "Nika Basketball Shoes." The video 320 of the home shopping program runs as a motion picture in a frame. In addition to the video 320, information 325 about the product is displayed in another frame, along with the quantity remaining 335, price 340, and instructions on ordering 345. A "Next" button 350 is available to the viewer 240 enabling him/her to skip the current home shopping program and begin the next home shopping program.

Figure 3C:
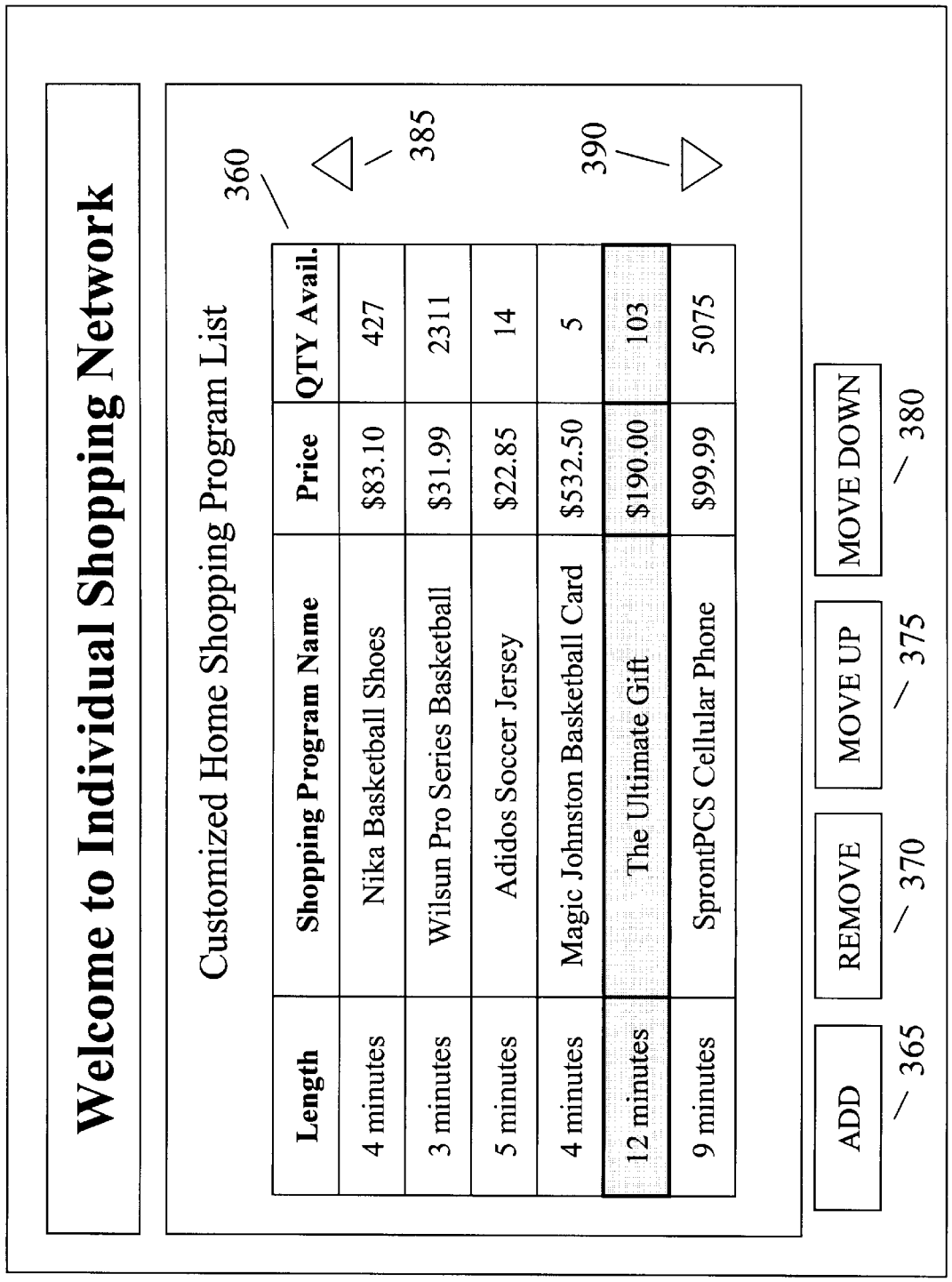

FIG. 3c is an exemplary screenshot of the customized home shopping program list 226 as presented to the viewer 240. The viewer 240 is given the ability to make modifications to his/her customized home shopping program list 360. The viewer may scroll through the customized home shopping program list 360 via the scroll up 385 and scroll down 390 buttons. The viewer may insert a new home shopping program above the currently selected home shopping program in the home shopping program list 360 by selecting the "ADD" button 365. The viewer may remove a particular home shopping program by selecting a home shopping program from the home shopping program list 360 and selecting the "REMOVE" button 370. In addition, the viewer may rearrange the home shopping program list 360 by moving the selected home shopping program up and down via the "MOVE UP" 375 and "MOVE DOWN" 380 buttons.

When the client 235 receives a customized home shopping program list 226 from the server 225, the client 235 may first display to a viewer a home shopping program that is listed in the customized home shopping program list 226. Thereafter, the viewer may activate the "next" button to begin viewing the next available home shopping program (e.g., the home shopping program next listed in the customized home shopping program list 226.) Thus, a viewer 240 need not view the customized home shopping program list 226 generated for him/her, but instead can view one home shopping program after another. Alternatively, the client 235 may initially display the customized home shopping program list 226 so that the viewer can select the home shopping program he/she desires to display. A function button may be provided to enable the viewer to return from home shopping programs to the customized home shopping program list 226 at any time.

FIGS. 4a, 4b, 4c, and 4d show another embodiment of the screenshots presented to the viewer 240 by the client 235. In FIGS. 4a and 4b, personalized data 241 is collected from the viewer 240. In FIG. 4a, the viewer 240 is prompted to specify the occasion for which the viewer 240 is shopping. Examples of occasions for shopping include browsing for a birthday gift, browsing for an anniversary gift, and looking for a wedding gift. If the viewer 240 selects to browse for a birthday gift, more information is collected from the viewer 240, as shown in FIG. 4b. The viewer 240 may then provide information related to the birthday gift.

In FIG. 4b, the viewer 240 has specified that the birthday gift is for a male 410 and between the age of ten and eighteen 420. In addition, the viewer 240 has specified the type of gift he/she wishes to purchase for this birthday gift. The viewer 240 has specified that he/she would like to purchase a gift of the types "Sporting Equipment" or "Electronics" 415. The viewer 240 has also provided a price range for the gift by specifying a price range of over ten dollars 425.

The information collected from FIGS. 4a and 4b become personalized data 241 for the viewer 240. The personalized data 241 is sent to the server 225 by the client 235. The server 225 generates a customized home shopping program list 226 based on the personalized data 241 and home shopping program media 210. The customized home shopping program list 226 is sent to the client 235 over the data network 230. The client 235 may immediately begin displaying the first home shopping program in the customized home shopping program list 226, as demonstrated in FIG. 4c. The viewer 240 may view his/her customized home shopping program list 226. The viewing of the customized home shopping program list 226 is shown in FIG. 4d. Modifications to the customized home shopping program list 465 may be made by the viewer 240 using buttons 470, 472, 475, 480, 485, and 490 in a manner similar to that described above with respect to the use of the buttons illustrated in FIG. 3C.

FIGS. 5a, 5b, 5c, and 5d show another embodiment of the home shopping program system. The viewer 240 chooses the desired occasion in FIG. 5a. In this example, the viewer 240 chooses the occasion of browsing for a wedding gift. In this case, the wedding couple needs to be registered with the system. Prior to the viewer 240 browsing for a wedding gift, the wedding couple would have registered themselves with the system and specified their wedding registry of gifts.

Figure 5D:
Figure 5D:

In FIG. 5b, the viewer 240 searches for the wedding couple by entering the last names of the bride and groom. The client 235 displays a list of matching wedding couples. The viewer 240 selects the correct wedding couple. Based on the personalized data 241 provided by the viewer in FIGS 5a and 5b, and the gifts previously registered by the wedding couple, the server 225 generates a customized home shopping program list 226. The customized home shopping program list 226 is transferred from the server 225 to the client 235 over the data network 230. The client 235 displays the first home shopping program to the viewer 240, as demonstrated in FIG. 5c. The viewer 240 may view his/her customized home shopping program list 226. The viewing of the customized home shopping program list 226 is shown in FIG. 5d. Modifications to the customized home shopping program list 550 may be made by the viewer 240 using buttons 555, 560, 565, 570, 575, and 580 in a manner similar to that described above with respect to the use of the buttons illustrated in FIG. 3C.

Figure 6:
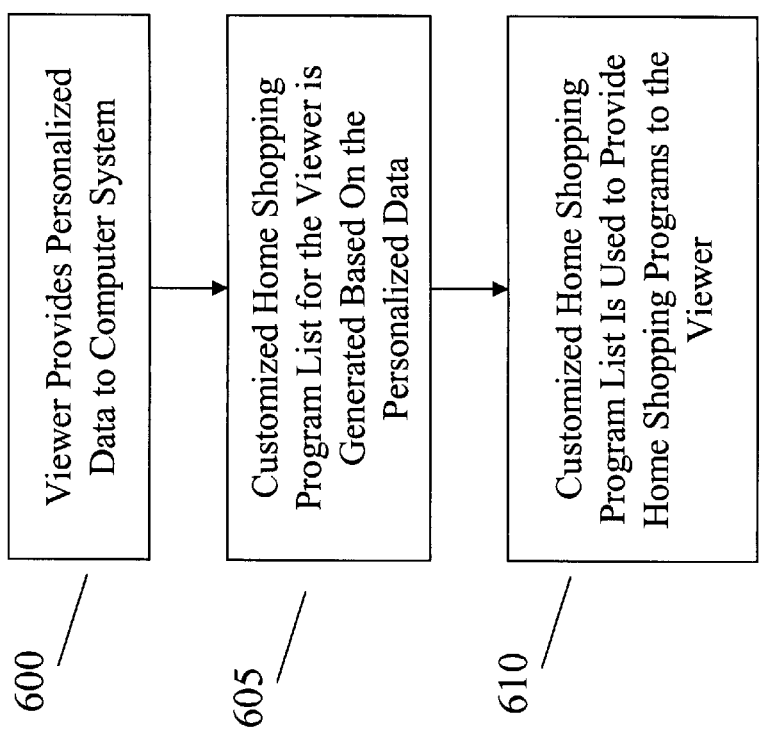
FIG. 6 is a high level flow chart of an embodiment of the present invention.

FIG. 6 shows a method for delivering customized home shopping programs to a viewer. The exemplary home shopping program system described herein above may be used to practice this method. In step 600, the viewer provides personalized data to the system. The personalized data is any data provided by the viewer that will be used by the system to determine a customized home shopping program list for the viewer. The personalized data may be provided once and stored within the system to prevent the viewer from having to provide the same personalized data each time the viewer uses the system. In step 605, a customized home shopping program list is generated for the viewer based on the personalized data provided by the viewer. In step 610, the customized home shopping program list is used to provide the viewer with personalized home shopping programs for viewing.

Figure 7:
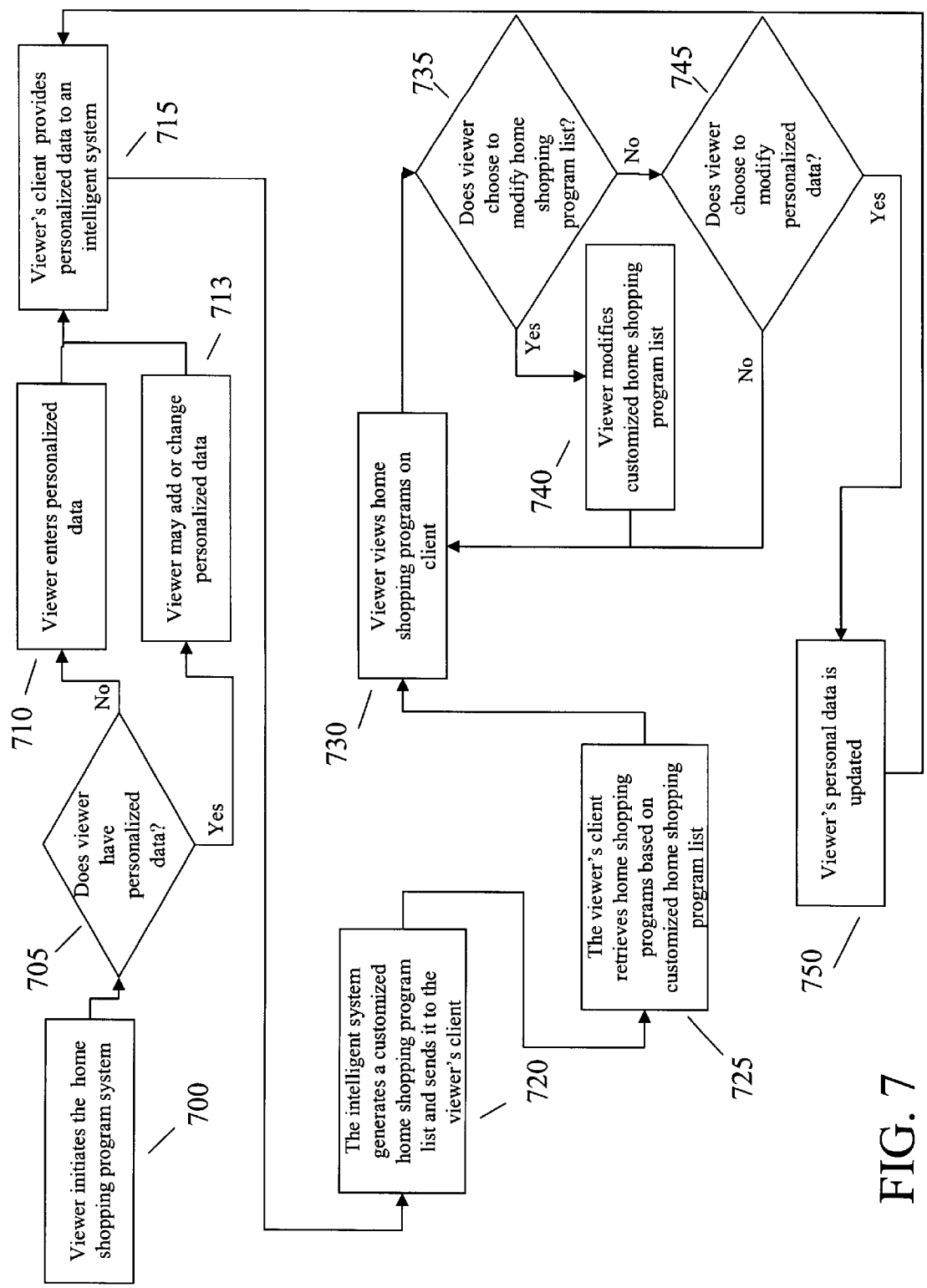
FIG. 7 is a detailed flow chart of an embodiment of the present invention.

FIG. 7 is a flowchart of an exemplary embodiment showing how a viewer would interact with the home shopping program system. At step 700, the viewer starts (e.g., logs onto the system, opens an appropriate menu of the system) the home shopping program system. At step 705, the system determines if the viewer already has personalized data stored on the system. If not, the viewer is prompted to provide the system with personalized data at step 710. If the system does have personalized data for the viewer, the viewer is given the option to add or change the personalized data at step 713. At step 715, the personalized data is passed to an intelligent system. Based on the personalized data, the intelligent system generates a customized home shopping program list that is sent to the client at step 720.

At step 725, the client retrieves the home shopping programs based on the customized home shopping program list provided by the intelligent system. The viewer watches one or more home shopping programs displayed by the client at step 730.

If the viewer chooses to modify the home shopping program list at step 735, the viewer can do so at step 740. Once the home shopping program list is modified, the viewer can begin viewing the altered home shopping program list at step 730. If the viewer chooses to modify the personalized data at step 745, the viewer may do so at step 750. Once the personalized data is modified, the personalized data is sent to the intelligent system at step 715 so that a newly customized home shopping program list is generated based on the new personalized data.

Figure 8:
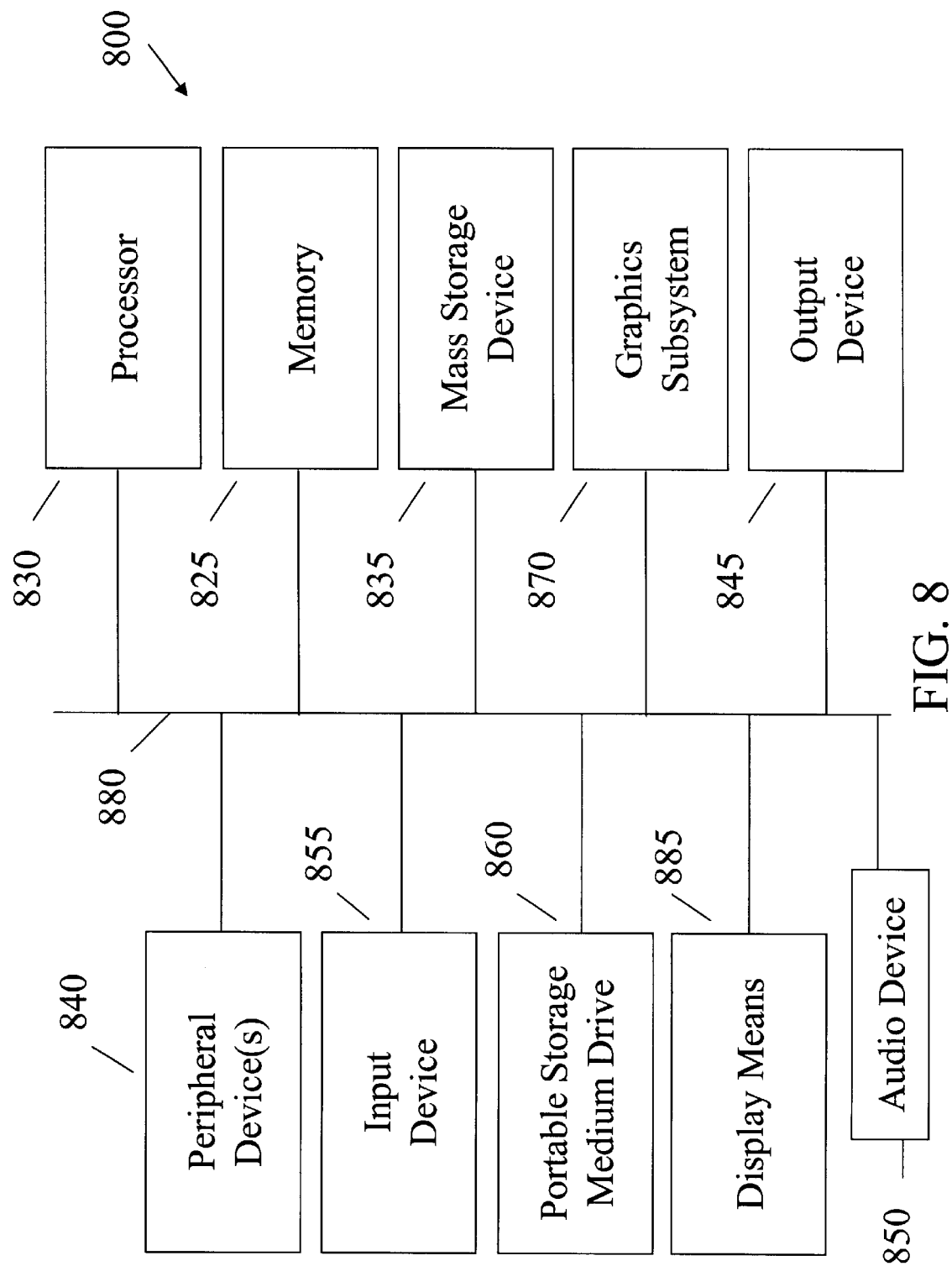
FIG. 8 is a block diagram view of a general purpose computer that may be used to implement an embodiment of the method and system of the present invention.

FIG. 8 shows a general purpose computer system 800 constructed in accordance with an exemplary embodiment of the present invention. The computer system 800 may function as a server and/or as a client as described herein above. The computer system 800 includes a processor 830 and memory 825. Processor 830 may contain a single microprocessor, or may contain a plurality of microprocessors for configuring the computer system 800 as a multi-processor system. In embodiments described above, the processor 830 includes the server processor and client processor of FIG. 2. Memory 825, stores, in part, instructions and data for execution by processor 830. If the system of the present invention is wholly or partially implemented in software, including computer instructions, memory 825 stores the executable code when the system is in operation. Memory 825 may include banks of dynamic random access memory (DRAM) as well as high speed cache memory.

Computer system 800 further includes a mass storage device 835, peripheral device(s) 840, output device 845, audio device 850, input device 855, portable storage medium drive 860, graphics subsystem 870, and a display means 885. For purposes of simplicity, the components shown in FIG. 8 are depicted as being connected via a single bus 880 (i.e. transmitting means). However, the components may be connected through one or more data transport means (e.g., Internet, Intranet, etc.) For example, processor 830 and memory 825 may be connected via a local microprocessor bus, and mass storage device 835, peripheral device(s) 840, portable storage medium drive 860, and graphics subsystem 870 may be connected via one or more input/output (I/O) buses.

Mass storage device 835, which is typically implemented with magnetic or optical disk drives is, in one embodiment, a non-volatile storage device for storing data and instructions for use by processor 830. Mass storage device 835 includes the storage medium of embodiments of the present invention, and the server storage medium and client storage medium in alternative embodiments. In another embodiment of the present invention, mass storage device 835 stores the algorithms of the server. The computer instructions that implement the method of the present invention also may be stored in processor 830.

Portable storage medium drive 860 operates in conjunction with a portable non-volatile storage medium, such as a floppy disk or other computer-readable medium, to input and output data and code to and from the computer system 800. In one embodiment, the method of the present invention that is implemented using computer instructions is stored on such a portable medium, and is input to the computer system 800 via the portable storage medium drive 860.

Peripheral device(s) 840 may include any type of computer support device such as an input/output (I/O) interface to add additional functionality to the computer system 800. For example, peripheral device(s) 840 may include a network interface card for interfacing computer system 800 to a network, a modem, and the like.

Input device 855 provides a portion of a user interface. Input device 855 may include an alpha-numeric keypad for inputting alpha-numeric and other key information, or a pointing device, such as a mouse, a trackball, stylus or cursor direction keys. In order to display textual and graphical information, the computer system 800 includes graphics subsystem 870 and display means 885. Display means 885 may include a cathode ray tube (CRT) display, liquid crystal display (LCD), or any other suitable display device known in the art for enabling a viewer to view the customized program.

Graphics subsystem 870 receives textual and graphical information and processes the information for output to display means 885. Display means 885 provides a practical application for providing the customized program of the present invention since the method of the present invention may be directly and practically implemented through the use of the display means 885. Suitable output devices 845 include speakers, printers, and the like.

The devices contained in the computer system 800 of FIG. 8 are those typically found in general purpose computers, and are intended to represent a broad category of such computer components that are well known in the art. Computer system 800 illustrates one platform which can be used for practically implementing the method or system of the present invention. Numerous other platforms can also suffice, such as Macintosh-based platforms available from Apple Computer, Inc. (Cupertino, Calif.), platforms with different bus configurations, networked platforms, multiprocessor platforms, other personal computers, workstations, mainframes, navigation systems, and the like.

In a further embodiment, the present invention also includes a computer program product that is a computer readable medium (media) having computer instructions stored thereon that can be used to program a computer to perform the methods of the present invention. The storage medium may include, but is not limited to, any type of disk including floppy disks, optical disks, DVD, CD ROMs, magnetic optical disks, RAMs, EPROM, EEPROM, magnetic or optical cards, or any type of media suitable for storing electronic instructions.

These same computer instructions may be located in an electronic signal that is transmitted over a data network that performs the methods of the present invention when loaded into a computer. The computer instructions are in the form of data being transmitted over a data network. In one embodiment, the methods of the present invention are implemented in computer instructions and those computer instructions are transmitted in an electronic signal through cable, satellite or other transmitting systems for transmitting the computer instructions in the electronic signals.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems and user applications. Ultimately, such computer readable media further includes software for performing the methods of the present invention as described above.

There are several advantages to the embodiments discussed above. The overall advantage is that viewers can now use this home shopping program system for nearly all of their shopping needs. This home shopping program system is substantially more efficient than the forms of home shopping program distribution systems currently available today. Viewers can shop much more efficiently by seeing products they're more likely to be interested in. With the new efficiencies and convenience introduced by the current invention, viewers will be inclined to shop more frequently through home shopping programs. As a further advantage, sellers will realize higher sales from the increase in usage and purchases.

Unlike anything found, in the prior art, the current invention gives each viewer the opportunity to provide input (e.g., personalized data). By giving the viewer the ability to provide such input, the current invention is able to customize a list of home shopping programs for the particular viewer. Generating and delivering a customized list of home shopping programs provides significant advantages over the prior art.

With the current invention, viewers are also empowered to modify their customized list of home shopping programs. Thus, viewers can now watch only those home shopping programs that they desire to watch. Further, viewers may now choose what home shopping program they want to watch and when they want to watch it. The ability for the viewer to control the list of home shopping programs holds a tremendous advantage over the prior art. In the prior art, viewers had no control over which home shopping program they could watch, and were at the mercy of the broadcasting schedule for home shopping programs. Viewers' only option was to either not watch the current home shopping program or wait to see what the next home shopping program would be. With the current invention, viewers no longer have this dilemma.

Although the present invention has been described in detail with respect to certain embodiments and examples, variations and modifications exist or can be foreseen that are within the scope of the present invention as defined in the following claims.

What is claimed is:

1. A method for providing home shopping programs to a viewer, comprising:

receiving personalized data from a viewer;

generating a home shopping program list that identifies a plurality of home shopping programs related to the personalized data, including informercials, advertisements and shopping channels, and transmitting a home shopping program identified in the home shopping program list to the viewer; receiving a modified version of the home shopping program list from the viewer, wherein receiving a modified version of the home shopping program list from the viewer includes receiving a modified version of the home shopping program list from the viewer, the modified version including a modification selected from a group comprising an inserted home shopping program, a removed home shopping program and a moved home shopping program.

2. A method as recited in claim 1, wherein the receiving step includes receiving personalized data from a viewer over a client and a data network.

3. A method as recited in claim 1, wherein the receiving step includes receiving personalized data from a viewer, the personalized data selected from a group comprising the gender, sports interests, and age of the viewer.

4. A method as recited in claim 1, wherein the receiving step includes receiving personalized data from a viewer, the personalized data related to occasions that are selected from a group comprising browse for myself, look for a specific item, browse for a birthday gift, browse for a mother's day gift, look for a wedding gift, browse for an anniversary gift, and browse for a baby shower gift.

5. A method as recited in claim 1, wherein the transmitting step includes transmitting a home shopping program identified in the home shopping program list to the viewer for immediate viewing.

6. A method as recited in claim 1, further comprising receiving purchase data from the viewer for a product or service offered in the home shopping program.

7. A method as recited in claim 1, further comprising receiving additional personalized data from the viewer.

8. A method for providing home shopping programs to a viewer, comprising:

providing a client in communication with a server;

transmitting personalized data over the client to the server;

receiving a home shopping program list that identifies a plurality of home shopping programs related to the personalized data, including infomercials, advertisements and shopping channels, receiving a home shopping program that is listed on the home shopping program list; and displaying the home shopping program on a display means of the client; selecting a home shopping program form the home shopping program list and displaying the selected home shopping program on the display means; and modifying the home shopping program list by selecting a function from a group of functions consisting of inserting a new home shopping program into, removing a home shopping program from, and moving a home shopping program within the home shopping program list.

9. A method as recited in claim 8, wherein the transmitting step includes transmitting personalized data over the client to the server via a data network.

10. A method as recited in claim 8, wherein the transmitting step includes transmitting personalized data over the client to the server, the personalized data selected from a group comprising the gender, sports interests, and age of the viewer.

11. A method as recited in claim 8, wherein the transmitting step includes transmitting personalized data over the client to the server, the personalized data related to occasions that are selected from a group comprising browse for myself, look for a specific item, browse for a birthday gift, browse for a mother's day gift, look for a wedding gift, browse for an anniversary gift, and browse for a baby shower gift.

12. A method as recited in claim 8, further comprising selecting a home shopping program from the home shopping program list and displaying the selected home shopping program on the display means.

13. A method as recited in claim 8, further comprising transmitting purchase data to the server for a product or service offered in the home shopping program.

14. A computer system for providing home shopping programs to a viewer, comprising:

a memory for storing personalized data, home shopping program lists, and home shopping programs; and a processor in communication with the memory, wherein the processor is operative to receive personalized data from a viewer, generate a home shopping program list that identifies a plurality of home shopping programs related to the personalized data, including infomercials, advertisements, and shopping channels, and transmit a home shopping program identified in the home shopping program list to the viewer, receive a modified version of the home shopping list from the viewer, and modify the home shopping program list by selecting a function from a group of functions consisting of inserting a new home shopping program into, removing a home shopping program from and moving a home shopping program within the home shopping program list.

15. A computer system as recited in claim 14, wherein the operative step to receive personalized data includes receive personalized data from a viewer over a client and a data network.

16. A computer system as recited in claim 14, wherein the operative step to receive personalized data includes receive personalized data from a viewer, the personalized data selected from a group comprising the gender, sports interests, and age of the viewer.

17. A computer system as recited in claim 14, wherein the operative step to receive personalized data includes receive personalized data from a viewer, the personalized data related to occasions that are selected from a group comprising browse for myself, look for a specific item, browse for a birthday gift, browse for a mother's day gift, look for a wedding gift, browse for an anniversary gift, and browse for a baby shower gift.

18. A computer system as recited in claim 14, wherein the processor is further operative to transmit the home shopping program list to the viewer.

19. A computer system as recited in claim 18, wherein the processor is further operative to receive a modified version of the home shopping program list from the viewer.

20. A computer system as recited in claim 14, wherein the processor is further operative to receive purchase data from the viewer for a product or service offered in the home shopping program.

21. A computer system as recited in claim 14, wherein the processor is further operative to receive additional personalized data from the viewer.

22. A computer system for providing home shopping programs to a viewer, comprising:

means for receiving personalized data from a viewer;

means for transmitting the personalized data to a server;

means for receiving a home shopping program list that identifies a plurality of home shopping programs related to the personalized data from the server, including infomercials, advertisements and shopping channels;

means for receiving a home shopping program, identified on the home shopping program list, from the server; and means for displaying the home shopping program to the viewer.

* * * * *